T. R. FERRALL.
LUBRICATING BLOCK.
APPLICATION FILED DEC. 2, 1911.

1,070,240. Patented Aug. 12, 1913.

WITNESSES:
M. E. Flaherty
J. J. Kenneally

INVENTOR:
Thomas R. Ferrall
by his attys

UNITED STATES PATENT OFFICE.

THOMAS R. FERRALL, OF WAKEFIELD, MASSACHUSETTS, ASSIGNOR TO BOSTON & LOCKPORT BLOCK COMPANY, OF LOCKPORT, NEW YORK, A CORPORATION OF NEW YORK.

LUBRICATING-BLOCK.

1,070,240.  Specification of Letters Patent.  Patented Aug. 12, 1913.

Application filed December 2, 1911. Serial No. 663,581.

*To all whom it may concern:*

Be it known that I, THOMAS R. FERRALL, of Wakefield, in the county of Middlesex and State of Massachusetts, a citizen of the United States, have invented a new and useful Improvement in Lubricating-Blocks, of which the following is a full, clear, and exact description, reference being had to the accompanying drawings, forming a part of this specification, in explaining its nature.

My invention relates to an improvement in blocks or pulleys and pertains particularly to the lubrication of the same.

It is the essential object of my invention to provide a construction whereby oil or grease kept in a receptacle forming a part of the block may be applied through its pin or axle to the friction-bearing surfaces of the block, it being my further object, also, to so form the structural parts of the block adjacent its friction-bearing surfaces that the oil or grease applied thereto may be held in the bearings and not allowed to escape.

My invention can best be seen and understood by reference to the drawings in which—

Figure 2:
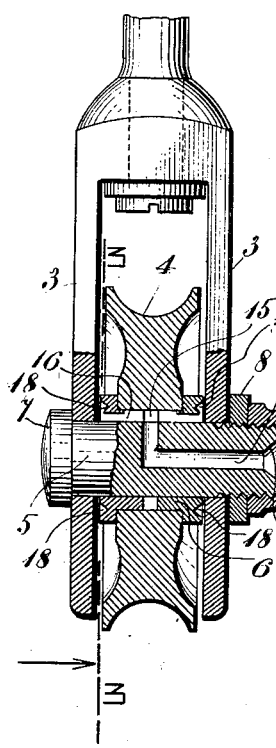
Figure 1:
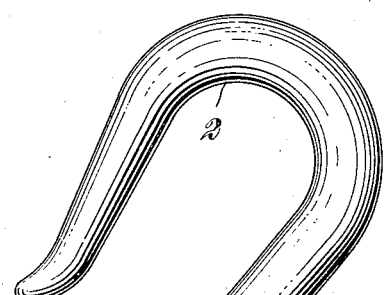
Figure 3:
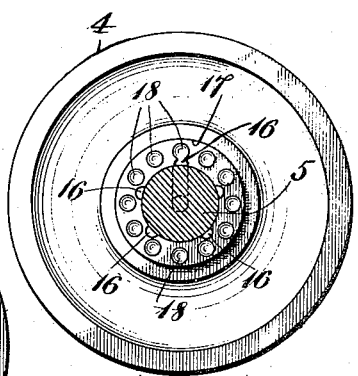
Figure 4:
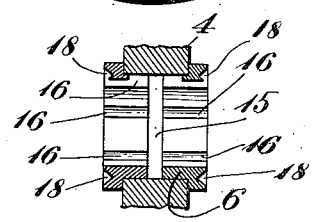

Figure 1 shows the pulley in side elevation. Fig. 2 is a section on the line 2—2 of Fig. 1. Fig. 3 is a side elevation from the point of the line 3—3 of Fig. 2. Fig. 4 is a longitudinal cross section of the bushing forming a part of the wheel of the block as will hereinafter be explained.

Referring to the drawings:—1 represents the head of the block to which is secured the hook 2 in the usual manner and from which depend straps 3, 3, carrying the wheel or sheave 4. The wheel 4 is interposed between the straps and mounted to turn upon a pin or axle 5 which passes through the straps and the bushing 6 of the wheel. The pin is held in place at one end by a head 7 which bears against one of the straps, and at the other end by a clamp nut 8 which bears against the other strap and is held in place by a locking nut 9, both nuts being arranged upon the projecting end of the pin. The pin is held from turning by means of a key adjacent the head 7 which is socketed in the strap against which the head bears.

The locking nut 9 is a relatively long tubular nut which projects for some little distance beyond the end of the pin which is formed with a cup or depression 10 therein, the parts accordingly forming a grease or oil-receiving receptacle 11 at the end of the pin. The outer end of the nut 9 and receptacle 11 is closed by means of a plug 12 threaded within the nut and provided with a thumb piece 13 by which the plug may be turned, the arrangement of the parts being such that the plug may be turned along the threaded interior of the nut until it engages the end of the pin or so far as may enable said plug to compress grease or oil contained within the receptacle. Communicating with the receptacle 11 formed at the end of the pin 5 is a passage 14 which passes longitudinally through the center of the pin to a point adjacent the longitudinal center of the bushing 6 of the sheave or wheel, the passage then turning outwardly and having an outlet in the peripheral surface of the pin at about the longitudinal center of said bushing.

The bushing 6 adjacent the outlet of the passage 14 is provided in the interior bearing surface thereof with a circumferential duct 15. Connecting with this duct are other ducts 16 which extend longitudinally along the interior of the bushing to the outer side edges 17 thereof. These outer side edges 17 of the bushing are those parts of the wheel which bear against the straps 3 for a lateral bearing for holding the wheel in place and accordingly form bearing surfaces. These surfaces are each provided, as shown in Fig. 3, with a multiplicity of depressions or cups 18 at least one of which is in communication with the longitudinally-extending ducts 16 as may be seen in Figs. 2 and 4.

The operation of the device is as follows:—The receptacle 11 and opening 10 at the end of the pin with the duct 14 are filled with grease. The plug 12 is then advanced compressing the grease and forcing it into the bearing between the pin and wheel filling the ducts 15 and 16 with grease and also those of the depressions 18 at the ends of the bushing to the wheel with which the ducts connect. With the grease thus applied, the bearing surfaces of the wheel, both between the wheel and the pin and the straps 3, become thoroughly lubricated and are kept lubricated for a long time. Of course some of the grease may tend to work out of the bearing between the ends of the bushing and the straps, but the most of this is caught in the other depressions 18 at the ends of the bushing and preserved for lubricating these end bearing surfaces. Moreover, the very formation of the device will tend to form a relatively close joint between the ends of the bushing and the straps for the nut 8, arranged as it is, will move the straps snugly up against the ends of the bushing but not so far as to interfere with the free and proper operation of the wheel.

Having thus fully described my invention, I claim and desire to secure by Letters Patent of the United States:—

In a block, the combination with the sides of the block, of a pin extending between said sides and having a threaded end projecting through and beyond one of said sides, a wheel rotatably mounted on said pin between said sides and having an interior bearing surface engaging said pin and end bearing surfaces engaging said sides, said interior bearing surface having a circumferential duct extending therearound and one or more longitudinal ducts extending from said circumferential duct to the ends of said bearing surface and said end bearing surfaces having one or more recesses with which said longitudinal ducts communicate, a clamp nut arranged upon the threaded end of said pin to bear against the adjacent side of the block, a locking nut having interior threads coöperating with said threaded end and projecting beyond the same, and a plug threaded to coöperate with said interior threads, said pin having also a duct communicating with the end thereof and with the interior of said locking nut and extending therefrom to communicate with the circumferential duct in said wheel.

THOMAS R. FERRALL.

Witnesses:
 JOHN E. R. HAYES,
 JAMES J. KENNEALLY.